United States Patent [19]
Bielby et al.

[11] Patent Number: 5,163,070
[45] Date of Patent: Nov. 10, 1992

[54] DIGITAL DATA SYNCHRONIZER

[75] Inventors: Robert R. N. Bielby, Cupertino; Richard L. Couchman, Ventura; Leo T. Van Lahr, Glendora, all of Calif.

[73] Assignee: Datatape Incorporated, Pasadena, Calif.

[21] Appl. No.: 623,825

[22] Filed: Dec. 7, 1990

[51] Int. Cl.$^5$ .............................................. H04L 7/02
[52] U.S. Cl. .................................... 375/115; 371/47.1
[58] Field of Search ................... 375/1, 114, 118, 113, 375/115; 370/105, 107, 105.1; 371/37.1, 37.7, 41, 47.1

[56] References Cited

U.S. PATENT DOCUMENTS

| 4,290,139 | 9/1981 | Walsh | 375/14 |
| 4,827,514 | 5/1989 | Ziolko et al. | 375/113 X |

Primary Examiner—Curtis Kuntz
Assistant Examiner—Tesfaldet Bocure
Attorney, Agent, or Firm—William F. Noval

[57] ABSTRACT

A digital data synchronizer, synchronizes a digital data system to an incoming serial bit stream having a segment of pseudo random bit sequence, which is a function of a predetermined primitive polynomial, preceeding the start of data. The synchronizer includes a first feedback shift register configured as a multiplier for generating the pseudo random bit sequence. The multiplier register operates on the incoming serial bit stream to determine whether a valid bit sequence of the primitive polynomial is present in the incoming serial bit stream, and if it is, a zero output is produced. A second feedback shift register configured as a divider produces a pseudo random bit sequence which is also a function of the predetermined primitive polynomial. A counter is provided to monitor the number of zeros outputted by the multiplier feedback shift register. When a preset count is reached, the contents of the multiplier shift register is parallel loaded into the divider shift register if the bit sequence of the divider shift register does not match the bit sequence of the incoming serial data. Thus, the divider pseudo random sequence is synchronized to the incoming serial data. A synch word detector monitors the parallel contents of the divider register. When the synch word detector detects a predetermined word in the pseudo random bit sequence produced by the divider, it produces an output flag which indicates the next bit in the incoming digital data word is the first data bit.

4 Claims, 3 Drawing Sheets

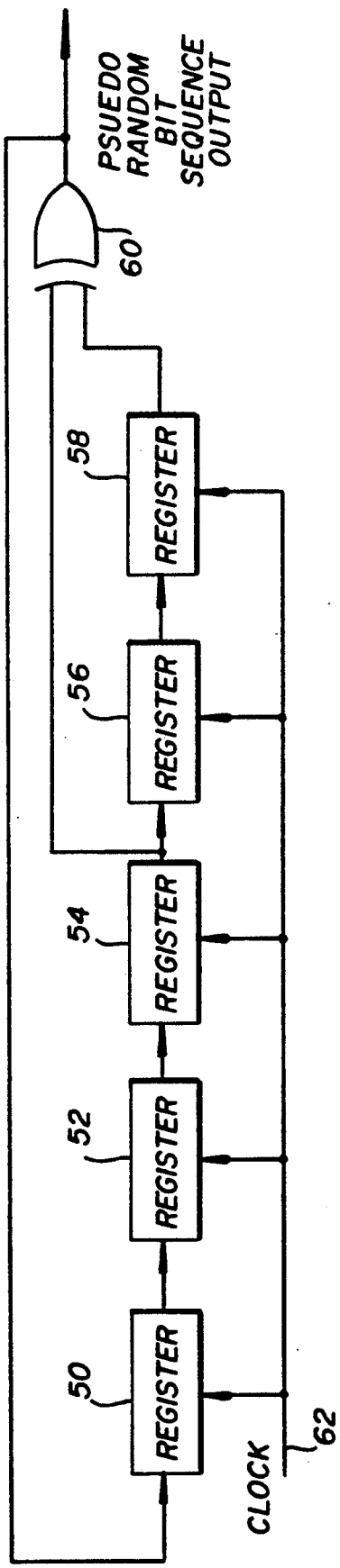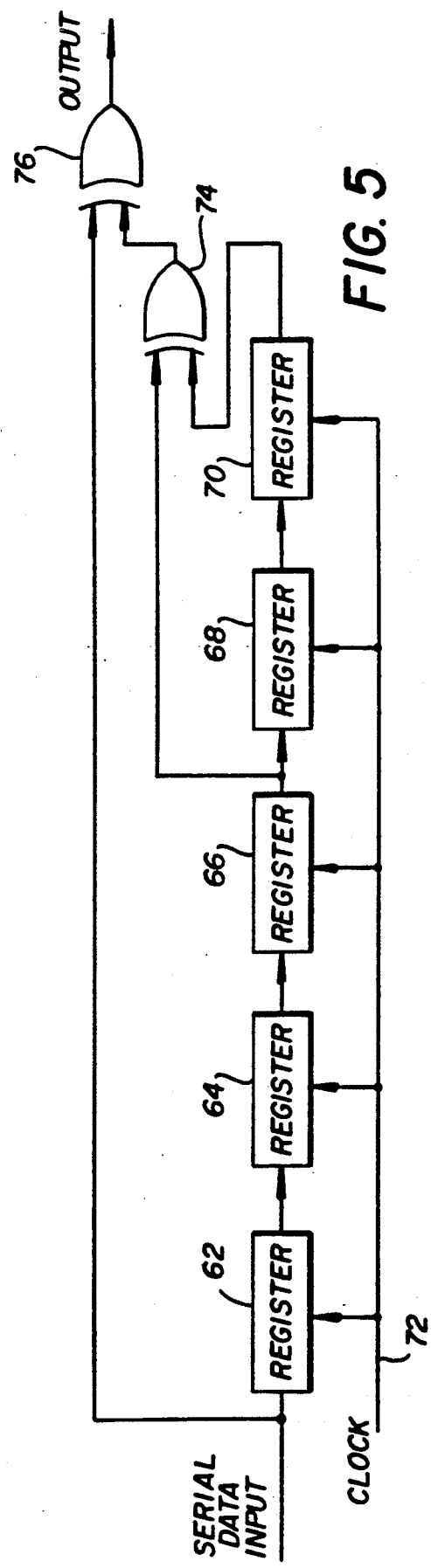

DIGITAL DATA SYNCHRONIZER

BACKGROUND OF THE INVENTION

1. Field of the Invention

The present invention relates in general to digital data apparatus and relates more particularly to a digital data synchronizer for synchronizing a digital data system with an incoming digital data bit stream having a psuedo random bit sequence which is preamble to the beginning of data.

2. Background Art

In many digital data systems which utilize a serial digital data stream, it is necessary to know positively when the beginning of data occurs in the serial bit stream. Thus, digital data utilized in magnetic tape recorders, magnetic or optical disk drives, data transmission links, or the like, must be synchronized to the digital data system so that the digital data bit stream may be properly interpreted (such as by decoding, deformatting, deinterleaving, or the like). A very robust method of identifying the start of data within a digital data bit stream and of detecting such start with high reliability, is to utilize a psuedo random sequence of data bits preceeding the start of data. The psuedo random bit sequence can be based on any one of a number of primitive polynomials. Thus, U.S. Pat. No. 4,290,139, issued Sep. 15, 1981, inventor D. M. Walsh discloses use of an adaptive equalizer for exact preamble synchronization by modifying the digital filter section to recognize predetermined sequences of signals in the received signal. The system is described as being used in modems which utilize data transmission rates of 4,800 bits per second or more. Such a system would be inappropriate for use in preamble synchronization of high speed digital data systems.

There is thus, a need for a digital data synchronizer which is simple and requires a small amount of components; which provides positive location information with a relatively small number of bits in a valid serial sequence; which can resynchronize if a bit slip occurs after synchronization; which will provide a start time based on a predetermined countdown even if no valid sequence is seen; which will accommodate loss of data in the preamble bit sequence due to drop outs; and which can operate effectively at high data rates.

SUMMARY OF THE INVENTION

According to the present invention, there is provided a digital data synchronizer which obviates the disadvantages of prior art synchronizers and satisfies the needs of the art. According to the invention, a digital data synchronizer is provided which is simple and requires a small number of components; which provides positive location information with a relatively small number of bits in a valid serial sequence; which can resynchronize if a bit slip occurs after synchronization of the countdown; which will provide the start time based on its predetermined countdown if no valid bit sequence is detected in the incoming digital data bit stream; which will accommodate dropouts in the preamble bit sequence; and which is effective in establishing data synchronization at high digital data rates.

According to a feature of the present invention, a digital data system is synchronized to a digital data bit stream having data which is preceded by a preamble constituting a psuedo random bit sequence segment which is a function of a predetermined primitive polynomial. According to a aspect of the present invention, two linear feedback shift registers are provided with one being configured as a multiplier and the other being configured as a divider, with the same primitive polynomial implemented in each shift register which was used in the incoming digital data preamble psuedo random bit sequence. Input digital data is shifted into the multiplier feedback shift register. If the multiplier determines that the incoming data sequence is a function of the recorded primitive polynomial bit sequence for a predetermined number of clock cycles, and if the input data stream is different from the output data stream of the divider feedback shift register, resynchronization is effected. Then, the contents of the multiplier feedback shift register are transferred into the divider shift register to update the divider shift register to the exact bit location of the incoming data stream. A synch word detector detects a predetermined word in the data stream produced by the divider shift register to produce a start data flag which indicates the next bit in the incoming digital data bit stream is a data bit.

BRIEF DESCRIPTION OF THE DRAWINGS

The invention will be described with respect to the following drawings in which like numerals refer to like elements.

FIGS. 4 and 5 are block diagrams useful in explaining the present invention.

DESCRIPTION OF THE PREFERRED EMBODIMENT

Figure 1:
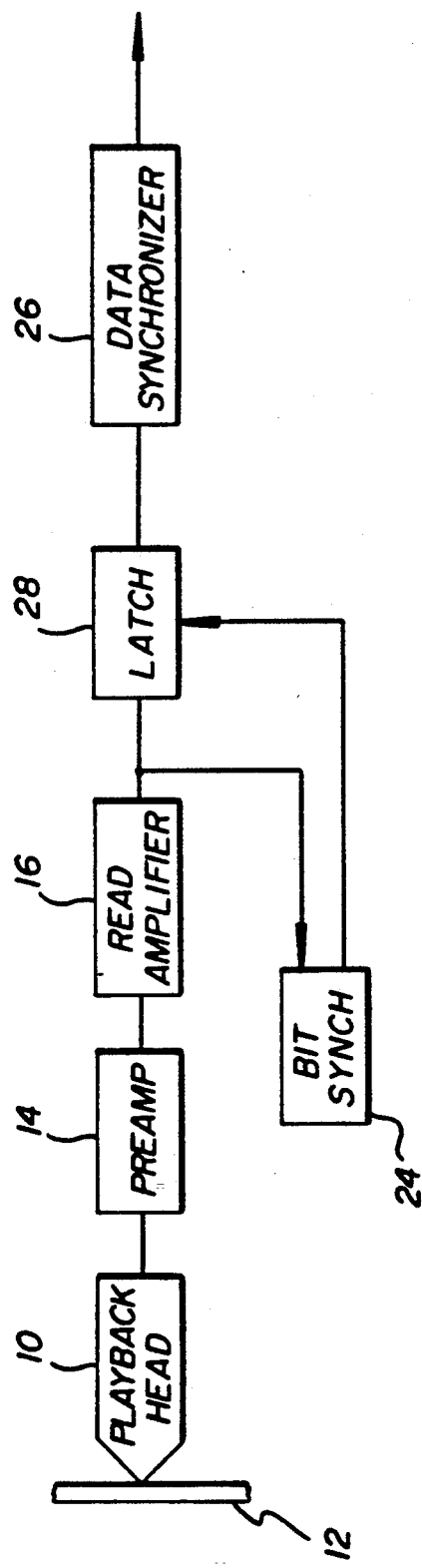
FIG. 1 is a block diagram of digital data apparatus incorporating an embodiment of the present invention.
Figure 2:
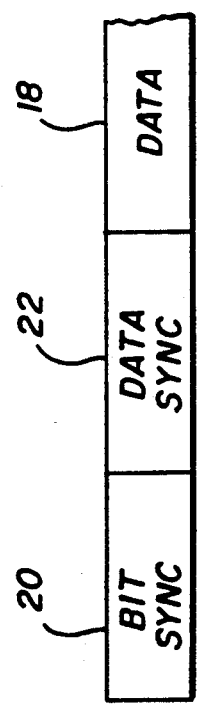
FIG. 2 is a diagrammatic showing of a digital data bit stream useful in explaining the operation of the present invention.

Referring now to FIG. 1, there is shown digital data apparatus incorporating an embodiment of the present invention. As shown, digital data apparatus comprises a magnetic tape recorder playback system having a playback head 10 which plays back digital data recorded on magnetic tape 12. The digital data is amplified in preamplifier 14 and further amplified in read amplifier 16. As shown in FIG. 2, the digital data played back from magnetic tape 12 includes a sequence of data bits 18 preceded by a bit synch word 20 and a preamble data synch word 22. In the apparatus shown in FIG. 1, bit synch circuit 24 establishes bit synchronization to the incoming bit stream so that the operation of the digital data system is in synchronization with the bit rate of the played back digital data. For example, the bit synch word 20 can be a series of alternating logic level ones and zeros which are utilized by bit synch circuit 24 to synchronize the clock of the digital data apparatus to the bit rate of the played back digital data.

The played back data stream is presented to data synchronizer 26 by latch 28.

Figure 3:
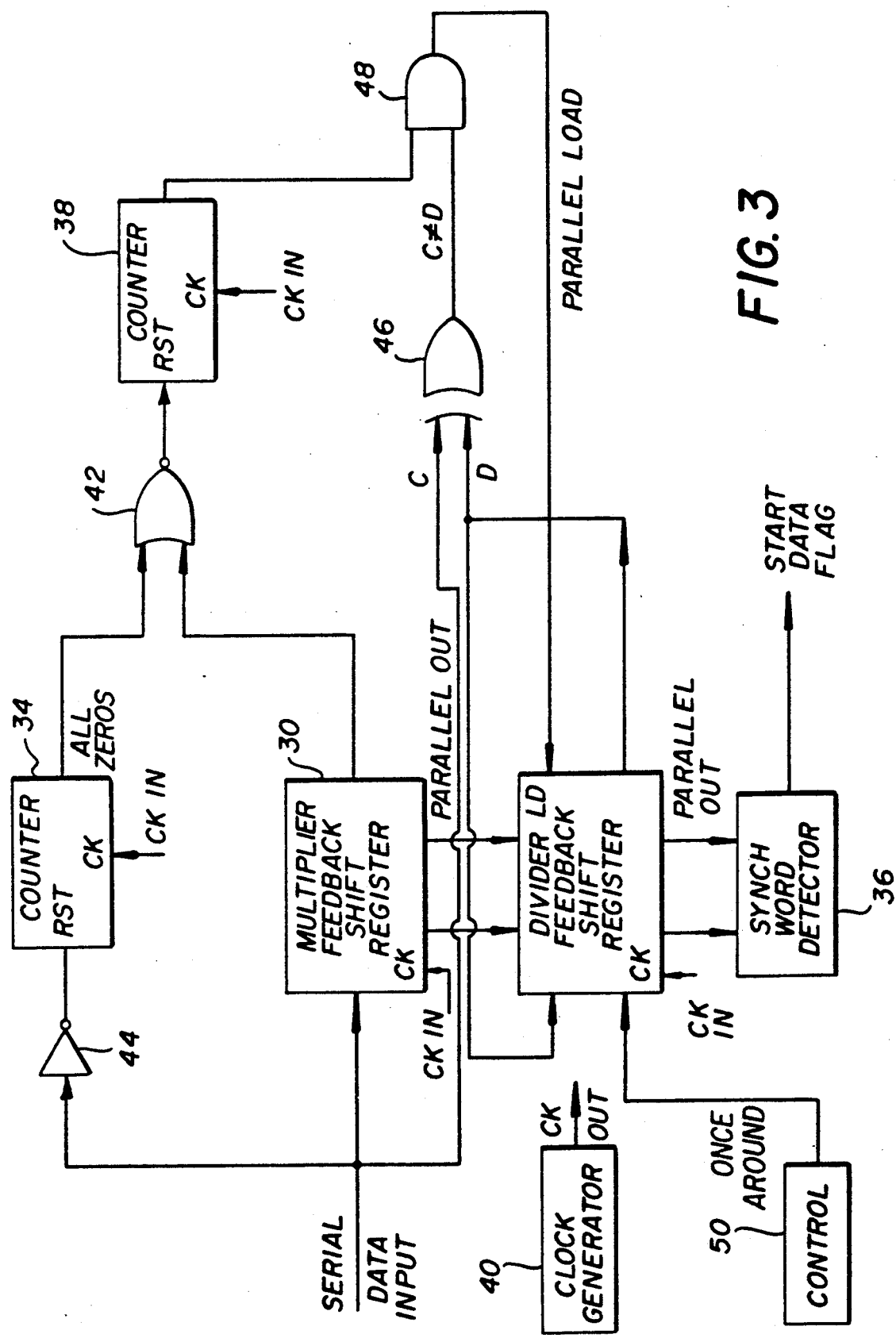
FIG. 3 is a block diagram of a preferred embodiment of the present invention.

A preferred embodiment of the digital data synchronizer of the present invention is shown in FIG. 3. The played back digital data stream shown in FIG. 2 includes a data synch word 22 which is contained in a preamble to the beginning of data bits 18. The data synch word is a predetermined number of bits in length and are the preselected values of a psuedo random bit sequence which is a function of a predetermined primitive polynomial. As an example, the data synch word 22 can be 2,048 bits long and include the 1,024 through 3,072 values of a psuedo random bit sequence of a sixteen degree primitive polynomial, which generates a unique pattern 65,000 bits long. As shown in FIG. 3, the digital data synchronizer of the present invention includes a multiplier feedback shift register 30 and a divider feedback shift register 32. Also provided is, all zero detector 34, synch word detector 36, valid sequence length detector 38, clock generator 40, NOR gate 42, inverter 44, exclusive OR gate 46, and AND gate 48. Feedback shift registers 30 and 32 are configured to generate psuedo random bit sequences which are a function of the same predetermined primitive polynomial as was used to generate the psuedo random bit sequence segment making up the data synch word of the incoming digital data bit stream.

Referring now to FIGS. 4 and 5, there are shown block diagrams of representative divider and multiplier feedback shift registers which are configured to produce a psuedo random bit sequence. As shown in FIG. 4, a divider feedback shift register includes in series registers 50, 52, 54, 56, and 58 and also exclusive OR gate 60. A clock signal is simultaneously applied to registers 50, 52, 54, 56, and 58 by means of clock signal line 62. The outputs of registers 54 and 58 are connected to exclusive OR gate 60 whose output is fed back to the input of the first register 50. The output of the divider feedback shift register is a psuedo random bit sequence which is a function of the primitive polynomial for which the shift registers 50-58 are wired to emulate.

As shown in FIG. 5, registers 62, 64, 66, 68, and 70 are connected in series and are clocked by a clock signal supplied over clock signal line 72. The outputs from registers 66 and 70 are applied to an exclusive OR gate 74. The psuedo random sequence derived from the preamble of the played back digital data bit stream is fed into the multiplier shift register at input shift register 62. The output from the exclusive OR gate 76 will always be zero, once the shift register has clocked in any sequence of N bits, which are a valid sequence of the primitive polynomial for which the multiplier was wired for, wherein N is the number of stages in the shift register. As each successive bit is clocked into the multiplier shift register after N valid bits have been clocked, the multiplier shift register output will remain a zero. The first wrong bit in the psuedo random bit sequence will cause the output to become a one.

Referring again to FIG. 3, because multiplier feedback shift register 30 will also give a zero output for an all zero input bit sequence, all zero detector 34 is provided. Detector 34 includes a counter which is reset whenever the played back digital data input is a one. Counter 34 is preset to count up to a fixed number of successive zeros which is greater than the longest string of zeros in the psuedo random bit sequence selected. If more zeros occur in the bit sequence than the psuedo random bit sequence would have, there is an error in the played back data bit sequence and all zero detector 34 will detect this by counting up to the preselected number.

Valid sequence length detector counter 38 monitors the output of multiplier feedback shift register 30 by counting the number of bits which have occurred when the output of multiplier register 30 is zero. This count indicates that the multiplier has processed N plus successive serial bits of the selected psuedo random bit sequence. Counter 38 is preset to a count which is a multiple of the length of the number of bits of the shift register. This count may be two, three or four times the length of the shift register. For example, if the shift register has sixteen registers, the preset count in counter 38 may be 32, 48 or 64. As long as multiplier register 30 continues to process an input data steam, which is a valid bit sequence of the psuedo random bit sequence it is configured for, the output of register 30 will remain zero and counter 38 will continue counting until it reaches a preset count.

When the preset count is reached, counter 30 applies an enable signal to one input of AND gate 48. Exclusive OR gate 46 is fed the input serial data on line C and the output data of divider register 32 on line D. When the two data streams are not equal, an enabling signal is applied to the other input of AND gate 48. AND gate 48 causes multiplier register 30 to parallel load the contents of its registers into like registers of divider register 32. This synchronizes the divider feedback shift register psuedo random bit sequence to be at the same point in its sequence as the incoming serial data.

Synch word detector 36 monitors the parallel contents of divider feedback shift register 32. A predetermined word in the psuedo random bit sequence count down is used as an indication of the start of data bits. When the psuedo random bit sequence produced by divider register 32 reaches this word, detector 36 provides a flag (signal) at its output which indicates that the next bit of the input digital data is the first data bit. Thus, data synchronization is effected.

Divider feedback shift register 32 has a preset input which is used to preset divider register 32 to a predetermined word in the psuedo random bit sequence. A simple preset word is one with all zeros.

Control 50 produces a once around start signal which is applied to divider feedback shift register 32 to preset the divider register 32 at the start of the input serial bit stream. For example, in the case of apparatus of FIG. 1, the once around start signal indicates the beginning of a new scan line from the tape. This preset signal allows divider register 32 to be used as a counter to signal when valid data should begin, even if the psuedo random bit sequence of data synch word 22 (FIG. 2) is never detected in the incoming serial data stream. Thus, the start data word value is reached within a few clock counts of the actual location on tape.

As an example, shift registers 30 and 32 are sixteen bit shift registers. The polynomial used for generating the psuedo random bit sequence has a degree of sixteen which generates a unique bit pattern 65,000 bits long. The data synch word 22 of FIG. 2 is the 1,024 through 3,072 bits of the primitive polynomial $X^{16}+X^{12}+X^3+X+1$. The bit synch word is the first 1,024 bits of the incoming digital data bit stream comprising alternating logic level ones and zeros.

According to the invention, resynchronization can take place anywhere in the 2,048 bit stream of the data synch word. This allows for a large drop out on tape to occur in any location in the synch word without any impact on the detection of the data synch word. Once resynchronization has occured, the divider is free running from the incoming data unless a bit slip occurs and then the resynchronization process is initiated again.

Although the invention has been described with respect to specific embodiments thereof, it will be understood that modifications and variations may be made within the scope of the present invention. Thus, the number of stages in shift registers 30 and 32 will be a function of the degree of the primitive polynomial used in generating the psuedo random bit sequence. In addition, primitive polynomials having degrees greater or less than sixteen may be used in generating the sequence of the present invention.

What is claimed is:

1. Digital data synchronizer apparatus comprising:
   multiplier feedback shift register means for generating a psuedorandom bit sequence which is a function of a predetermined primitive polynomial, wherein said multiplier feedback shift register means includes a plurality of serially connected shift registers having a serial input and a serial output;
   divider feedback shift register means for generating a psuedorandom bit sequence which is a function of said predetermined primitive polynomial, wherein said divider feedback shift register means includes a like plurality of serially connected shift registers connected in parallel to said plurality of shift registers of said multiplier feedback shift register means;
   a digital data source of a digital data serial bit stream including a synchronization series of bits forming a preselected partial sequence of a psuedorandom bit sequence which is generated as a function of said predetermined primitive polynomial;
   wherein said source provides said synchronization series of bits to said input of said multiplier feedback shift register means;
   first bit comparator means for comparing bit by bit the output of said multiplier feedback shift register means and said synchronization series of bits of said digital data serial bit stream from said digital data source and for producing a binary signal of a first value when said compared bits are of the same binary value and for producing a binary signal of a second value when said compared bits are of a different binary value;
   valid sequence length detector counter means for counting the binary signals of said first value produced by said first bit comparator means and for producing a first enable signal when said count reaches a preset value;
   second bit comparator means for comparing bit by bit the output of said divider feedback shift register means and said synchronization series of bits of said digital data serial bit stream from said digital data source and for producing a second enable signal when said compared bits are of a different binary value; and
   control means, responsive to receipt of said first and second enable signals, for controlling said multiplier feedback shift register means to parallel load the contents of said plurality of shift registers thereof into the like shift registers of said divider feedback shift register means to synchronize said pseudo random bit sequence produced by said divider feedback shift register means to be at the same point in its sequence as the synchronization series of bits of said digital data serial bit stream from said digital data source.

2. The apparatus of claim 1 wherein said first and second bit comparator means are exclusive or gates.

3. The apparatus of claim 1 wherein said control means is an and gate.

4. The apparatus of claim 1 wherein the psuedorandom bit sequence which is generated as a function of said predetermined primitive polynomial has a maximum number of consecutive binary zeros and including an all binary zero counter means for counting the number of zeros in said synchronization series of bits of said digital data serial bit stream from said digital data source and, if said binary zero count exceeds said maximum number, for producing an error signal which indicates that there is an error in said digital data serial bit stream from said digital data source.

* * * * *